United States Patent
Yasunaga

(10) Patent No.: US 8,244,096 B2
(45) Date of Patent: Aug. 14, 2012

(54) OPTICAL DISK DEVICE AND ADVERTISING SYSTEM

(75) Inventor: Satoshi Yasunaga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 325 days.

(21) Appl. No.: 12/687,182

(22) Filed: Jan. 14, 2010

(65) Prior Publication Data

US 2010/0183283 A1     Jul. 22, 2010

(30) Foreign Application Priority Data

Jan. 16, 2009   (JP) .................................. 2009-007921

(51) Int. Cl.
*H04N 9/80* (2006.01)
(52) U.S. Cl. ........................................ 386/241; 386/336
(58) Field of Classification Search .................... None
See application file for complete search history.

(56) References Cited

U.S. PATENT DOCUMENTS

| | | | |
|---|---|---|---|
| 6,177,931 B1 | 1/2001 | Alexander et al. | |
| 2004/0010806 A1* | 1/2004 | Yuen et al. | 725/136 |
| 2006/0080557 A1 | 4/2006 | Kim et al. | |
| 2006/0265280 A1* | 11/2006 | Nakada et al. | 705/14 |
| 2007/0211158 A1 | 9/2007 | Icho | |
| 2008/0132187 A1 | 6/2008 | Hanebeck | |
| 2008/0263099 A1 | 10/2008 | Brady-Kalnay et al. | |
| 2009/0254548 A1* | 10/2009 | Nagano et al. | 707/5 |

FOREIGN PATENT DOCUMENTS

| | | |
|---|---|---|
| EP | 2 109 078 A1 | 10/2009 |
| JP | 2008-204261 A | 9/2008 |
| WO | WO 2008/057345 A2 | 5/2008 |

OTHER PUBLICATIONS

Extended European Search Report of corresponding EP Application No. 10 15 0970.1 dated Jun. 4, 2010.

* cited by examiner

*Primary Examiner* — Huy T Nguyen
(74) *Attorney, Agent, or Firm* — Global IP Counselors

(57) ABSTRACT

An optical disk device includes a reproduction component, a determination component, a memory component, a communication component, and an output component. The reproduction component reproduces contents stored in optical disks. The determination component determines genres of the contents while the reproduction component reproduces the contents. The memory component stores a first table that associates each of the genres that have been determined by the determination component with a reproduction counter that indicates a number of times the reproduction component has reproduced the contents that belong to each of the genres. The communication component downloads from a server advertising data corresponding to one of the genres stored in the first table. The one of the genres is selected based on the reproduction counter of the first table. The output component outputs an advertisement based on the advertising data that is downloaded by the communication component.

11 Claims, 9 Drawing Sheets

FIG. 5

| TITLE | GENRE |
|---|---|
| ·········· | ·········· |
| DETECTIVE MARUI | ANIME |
| ICE PENTA | ANIME |
| THE TALE OF WILD BIRD | ANIME |
| THE COSTA RICAN RIDDLE | FOREIGN MOVIE |
| ······ | ······ |

29A

| GENRE | NUMBER OF TIMES REPRODUCED |
|---|---|
| ANIME | 5 |
| FOREIGN MOVIE | 3 |
| JAPANESE MOVIE | 2 |
| ⋮ | ⋮ |

OPTICAL DISK DEVICE AND ADVERTISING SYSTEM

CROSS-REFERENCE TO RELATED APPLICATIONS

This application claims priority to Japanese Patent Application No. 2009-007921 filed on Jan. 16, 2009. The entire disclosure of Japanese Patent Application No. 2009-007921 is hereby incorporated herein by reference.

BACKGROUND

1. Field of the Invention

The present invention generally relates to an optical disk device. More specifically, the present invention relates to an optical disk device connected to a network.

2. Background Information

Optical disk devices that reproduce content recorded to a BD (Blu-ray disc) or other such optical disk and are under a network-connected environment have become popular.

One type of such a conventional optical disk is a BD-Live compatible Blu-ray disc having prerecorded browser software. BD-Live is an advertising providing service in which a server is accessed through an optical disk device connected to a network, advertising data showing the latest movie previews, the dates when movies open at theaters, the dates Blu-ray discs go on sale, and so forth is downloaded, and advertisement is displayed on a television or the like connected to the optical disk device.

When the user launches browser software while a BD-Live compatible Blu-ray disc has been placed in the device main body of the optical disk device, the optical disk device accesses the server and downloads advertising data from the server. Consequently, the user sees the advertisement displayed on the television, etc. An information recording and reproduction device also has been proposed (see Japanese Laid-Open Patent Application Publication No. 2008-204261, for example).

However, with a conventional optical disk device, the advertisement that is displayed does not necessarily match the user's preferences and interests. Accordingly, with the conventional optical disk device, advertisement that is different from the user's preferences and interests is often displayed on the television, etc. Thus, with the conventional optical disk device, it is often the case that either the user does not look at the advertisement that is displayed, or BD-Live is not utilized even though the optical disk placed in the device main body of the optical disk device is a BD-Live compatible Blu-ray disc. Therefore, with the conventional optical disk device, the advertisement provided by the optical disk that prerecords browser software is ineffective at conveying the advertising message.

SUMMARY

The present invention was conceived in light of the above-mentioned problems. One object of the present invention is to provide an optical disk device and an advertising system with which advertisement that corresponds to the user's preferences and interests can be adequately provided.

In accordance with one aspect of the present invention, an optical disk device includes a reproduction component, a determination component, a memory component, a communication component, and an output component. The reproduction component is configured to reproduce contents stored in optical disks that are loaded in the optical disk device. The determination component is configured to determine genres of the contents while the reproduction component reproduces the contents. The memory component is configured to store a first table that associates each of the genres that have been determined by the determination component with a reproduction counter that indicates a number of times the reproduction component has reproduced the contents that belong to each of the genres. The communication component is configured to communicate with a server via a network. The communication component is further configured to download from the server advertising data corresponding to one of the genres stored in the first table. The one of the genres is selected based on the reproduction counter of the first table. The output component is configured to output an advertisement based on the advertising data that is downloaded by the communication component.

With the optical disk device of the present invention, it is possible to provide an optical disk device and an advertising system with which advertisement that corresponds to the user's preferences and interests can be adequately provided.

BRIEF DESCRIPTION OF THE DRAWINGS

Referring now to the attached drawings which form a part of this original disclosure:

FIG. 5 is a diagram illustrating contents of a conversion table in which titles and genres are pre-associated;

FIG. 7 is a diagram illustrating contents of a storage table in which genres and reproduction counts are associated;

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
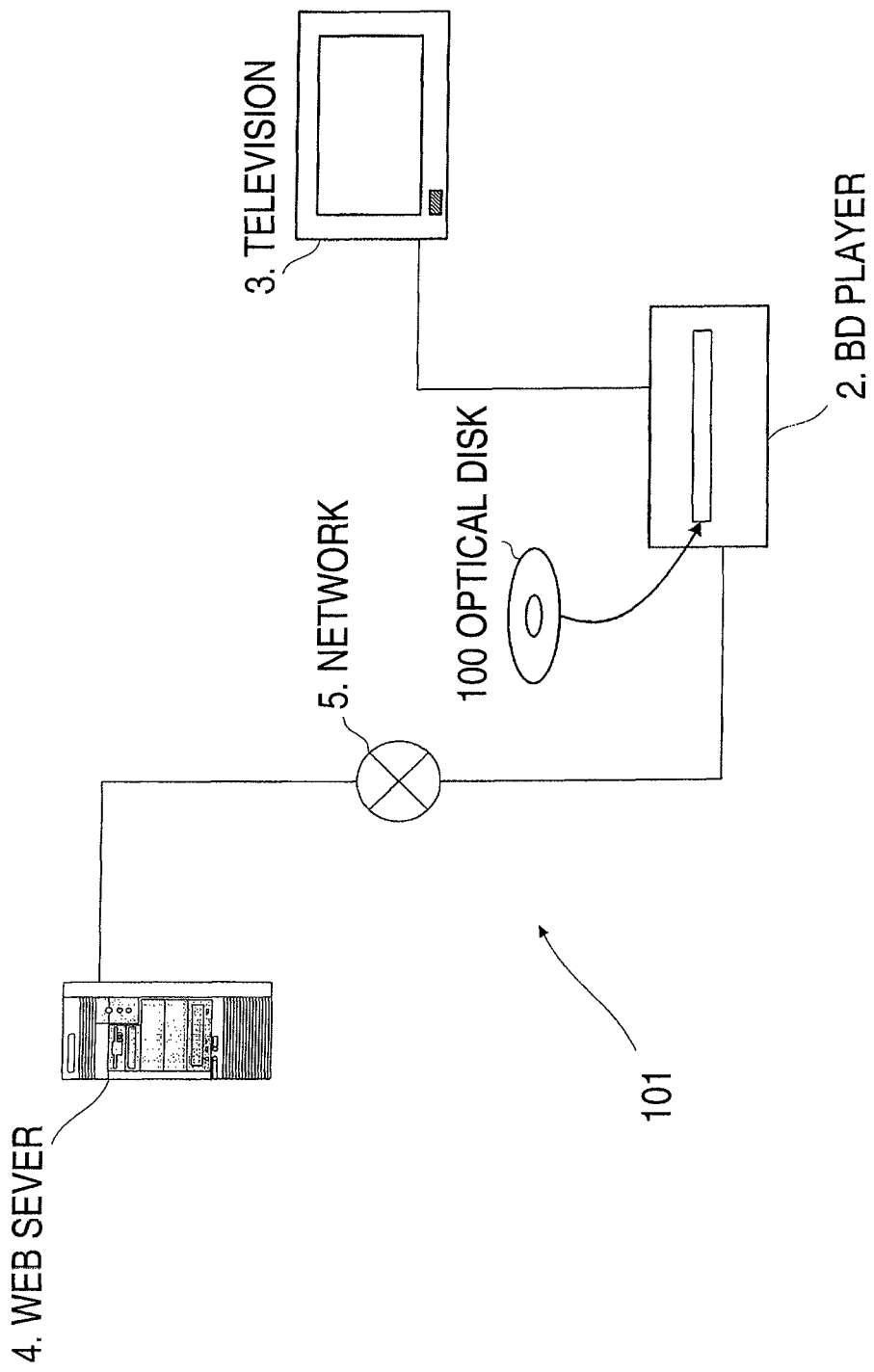
FIG. 1 is a diagram illustrating an advertising system in accordance with one embodiment of the present invention.

FIG. 1 is a diagram illustrating an advertising system 101. The advertising system 101 includes a BD player (e.g., optical disk device) 2, a television (e.g., display device, hereinafter "TV") 3, and a Web server (e.g., server) 4. An optical disk 100 is loaded to the BD player 2. The TV 3 is electrically connected to the BD player 2 via an interface. The Web server 4 is connected to the BD player 2 via a network 5, such as the Internet.

The BD player 2 and the TV 3 are used at home by users. The Web server 4 is a server provided on the network 5. That is, a plurality of optical disk devices including the BD player 2 is connected via the network 5 to a single Web server 4.

The optical disk 100 is, for example, a BD-ROM manufactured according to BD (Blu-ray disc) standards, a BD-Live compatible BD-ROM that prerecords browser software, or a DVD-ROM. The optical disk 100 is an optical disk that is purchased and owned by the user. The term "BD-Live" here refers to an advertising providing service. With BD-Live, the Web server 4 is accessed through the BD player 2 that is connected to the network 5, advertising data showing the latest movie previews, the dates when movies open at theaters, the dates Blu-ray discs go on sale, and so forth is downloaded by the BD player 2, and advertisement is displayed on the TV 3.

The BD player 2 reads content data from the optical disk 100 and outputs the content data through the interface to the TV 3. Consequently, the BD player 2 reproduces the content recorded to the optical disk 100 on the TV 3.

The network 5 includes the Internet.

Figure 2:
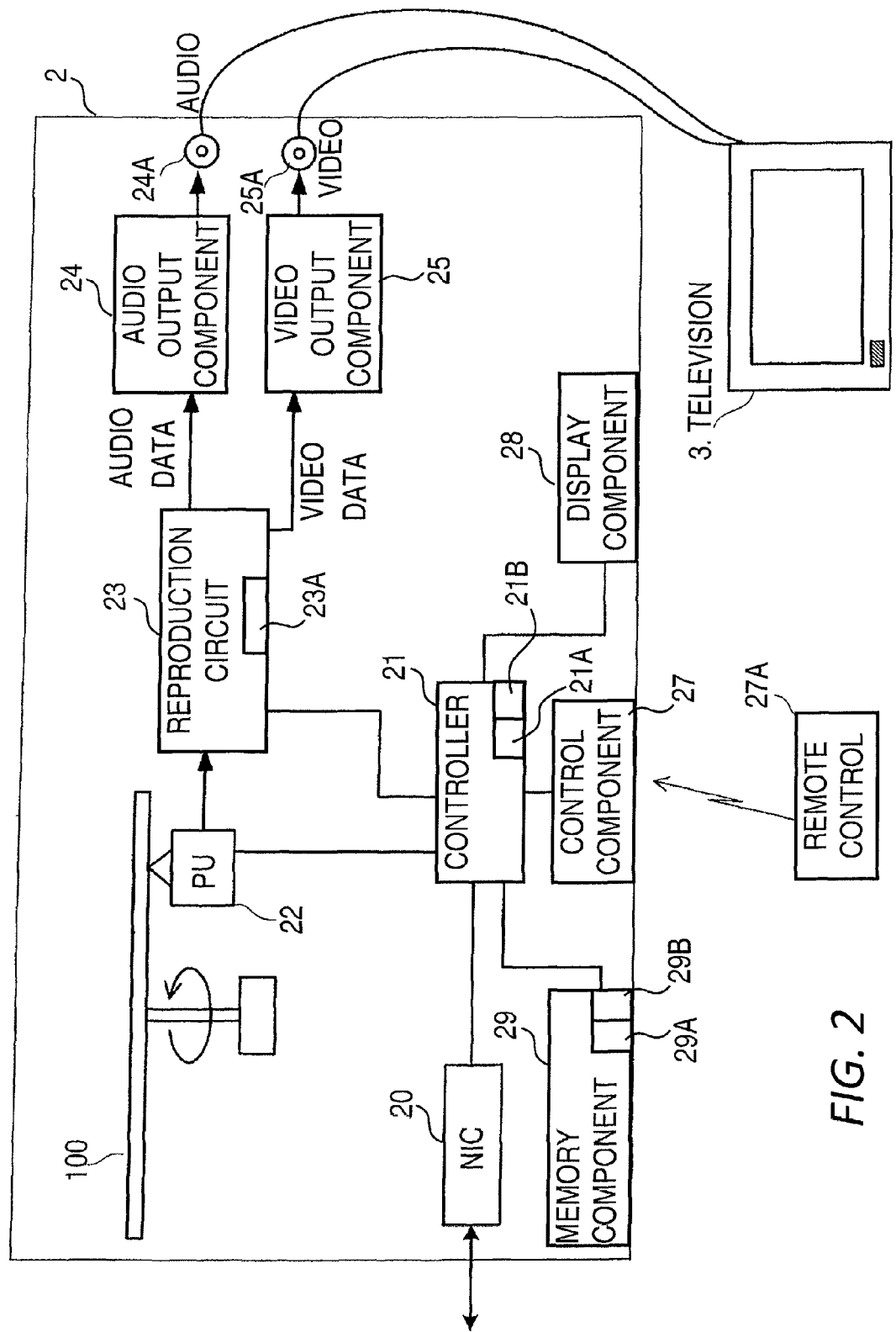
FIG. 2 is a block diagram illustrating a BD player of the advertising system illustrated in FIG. 1.

FIG. 2 is a block diagram illustrating the BD player 2 used in the advertising system 101. The BD player 2 includes a controller (e.g., determination component, communication component, selection component) 21, a pickup head (PU head) 22, a reproduction circuit (e.g., reproduction component) 23, an audio output component (e.g., output component) 24, a video output component (e.g., output component) 25, a control component 27, a display component 28, a memory component 29, and an NIC (network interface card) (e.g., a communication component) 20. The controller 21 controls the operation of the various components of the device main body of the BD player 2. The pickup head 22 reads data from the optical disk 100. The reproduction circuit 23 decodes data outputted from the pickup head 22. In other words, the reproduction circuit 23 reproduces content of the optical disk 100. The audio output component 24 converts audio data outputted from the reproduction circuit 23 into analog reproduction audio signals. The video output component 25 converts the image data outputted from the reproduction circuit 23 into analog reproduction image signals. The control component 27 receives the control input of the user that is inputted by a plurality of control keys provided to the control component 27 or inputted by a remote control 27A that remotely controls the BD player 2. The display component 28 displays information. The memory component 29 stores data. The NIC 20 is connected to the network 5 via a router (not shown).

The pickup head 22 has an actuator, a thread motor, a photodetector, an object lens, a beam splitter, a collimator lens, and a laser diode (LD) (not shown).

First, the reproduction by the BD player 2 will be discussed in detail.

The pickup head 22 emits a laser beam at the optical disk 100, and light reflected by the optical disk 100 is detected by the photodetector. Consequently, the pickup head 22 optically reads the data recorded to the optical disk 100.

The reproduction circuit 23 produces RF signals based on the output of a plurality of light receiving elements in the pickup head 22, and amplifies the RF signals. The reproduction circuit 23 then processes the RF signal and takes out image and audio data. The image and audio data taken out here are temporarily held in a buffer memory 23A of the reproduction circuit 23. The reproduction circuit 23 sequentially reads the data from the buffer memory 23A, and subjects the data to MPEG decoding, for example. The reproduction circuit 23 then outputs the audio data to the audio output component 24 and the image data to the video output component 25 while synchronizing the data.

The audio output component 24 converts the audio data into an analog reproduction audio signal, and outputs the reproduction audio signal from an audio port 24A to the TV 3 on the outside of the BD player 2. The video output component 25 converts the image data outputted from the TV 3 into an analog reproduction image signal and outputs the reproduction audio signal from a video port 25A to the TV 3 on the outside of the BD player 2.

The TV 3 processes the signal outputted from the BD player 2 through the interface, and displays an image on a screen of the TV 3, and outputs audio from a speaker of the TV 3.

A user can view an image based on the reproduction image signal outputted from the video output component 25, and hear audio based on the reproduction audio signal outputted from the audio output component 24. This allows the user to see and hear the content recorded to the optical disk 100.

The display component 28 displays the current time, the setting status of the BD player 2, specific messages, and so forth.

The control component 27 is used by the user to input various commands to the BD player 2. The control component 27 is provided with the control keys that are used by the user. A command inputted by the user to the BD player 2 is sent to the controller 21. The control keys include a play key for directing the reproduction of the optical disk 100, and a select key for selecting the chapters of the content or BD-Live on a menu screen (discussed below). The control component 27 also includes a remote control signal detector (not shown). When the remote control 27A is used to input a command, such as turning the power on or off or directing reproduction, to the remote control signal detector, the remote control signal detector of the control component 27 receives the command signal from the remote control 27A and sends the command signal to the controller 21. The remote control 27A is provided with the same keys as the control component 27.

The memory component 29 includes an EEPROM, for example. The memory component 29 stores control programs in which are described the methods for controlling the various components of the device main body of the BD player 2. The memory component 29 further stores a conversion table (e.g., second table) 29A (described below and shown in FIG. 5) and a storage table (e.g., first table) 29B (described below and shown in FIG. 7). The conversion table 29A and storage table 29B will be discussed in detail below. The memory component 29 also stores the URL of the Web server 4. The URL is information indicating the address of the Web server 4 on the network 5.

The controller 21 includes a microprocessor, for example. The controller 21 also includes a RAM 21A and a timer circuit 21B. The RAM 21A serves as a work field for expanding the control programs, etc. The timer circuit 21B keeps track of the current time. The controller 21 controls the operation of the various components of the BD player 2 in response to the commands inputted by the user with the control component 27.

The pickup head 22, the reproduction circuit 23, the audio output component 24, and the video output component 25 correspond to the "reproduction means". The controller 21 corresponds to the "determination means". The reproduction circuit 23, the audio output component 24 and the video output component 25 correspond to the "output means". And the controller 21 and the NIC 20 correspond to the "communication means".

Figure 3:
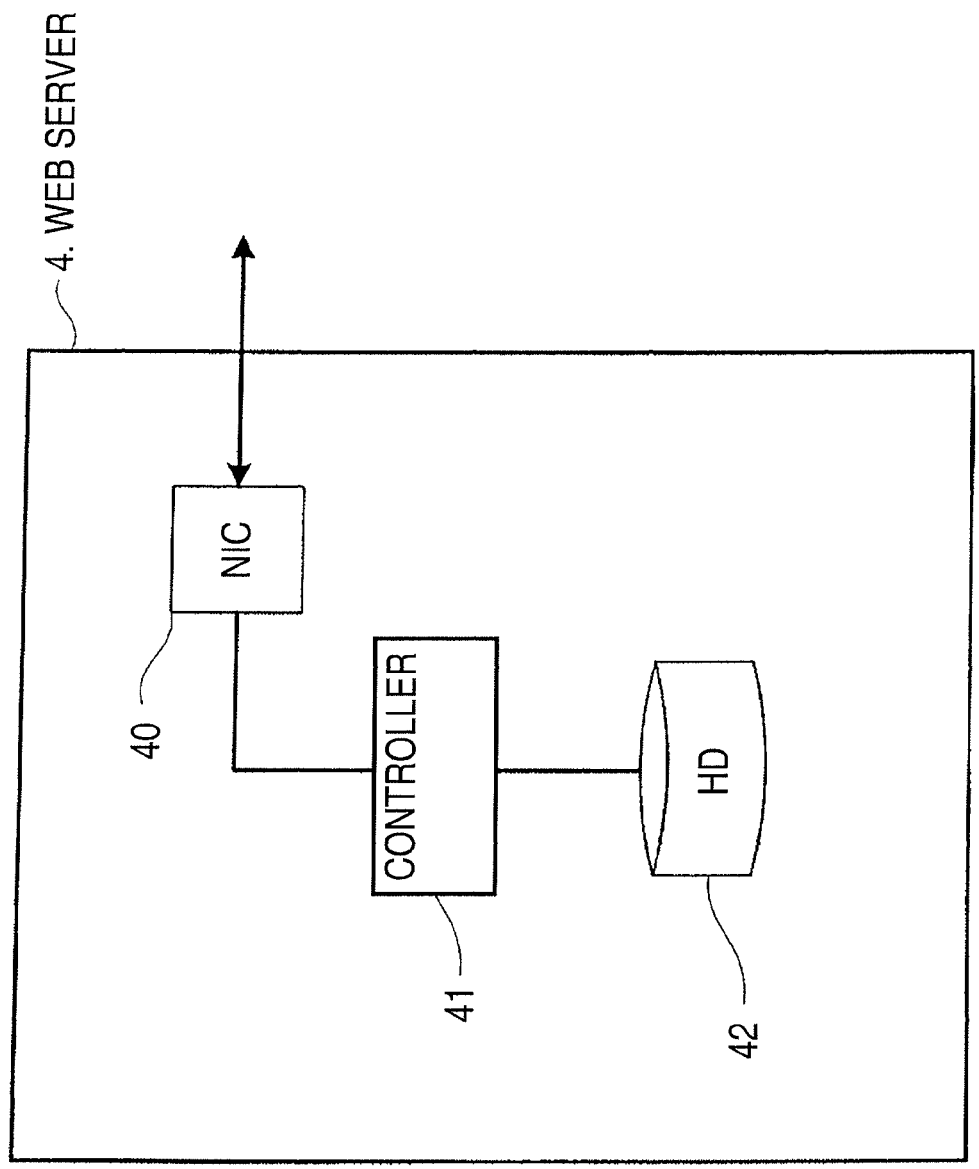
FIG. 3 is a block diagram illustrating a Web server of the advertising system illustrated in FIG. 1.

FIG. 3 is a block diagram illustrating the Web server 4 used in the advertising system 101. The Web server 4 includes an NIC (network interface card) 40, a controller 41, and a hard disk 42. The NIC 40 is connected to the network 5 via a router (not shown). The controller 41 controls the operation of the various components of the Web server 4. The hard disk 42 stores control programs in which are described the methods for controlling the various components of the Web server 4. The Web server 4 is located to a company that offers BD-Live compatible BD-ROM.

The controller 41 includes an MPU, for example. The controller 41 also includes a RAM (not shown) serving as a work field for expanding the control programs.

The controller 41 corresponds to the "reply means". The hard disk 42 corresponds to the "memory means".

Figure 4:
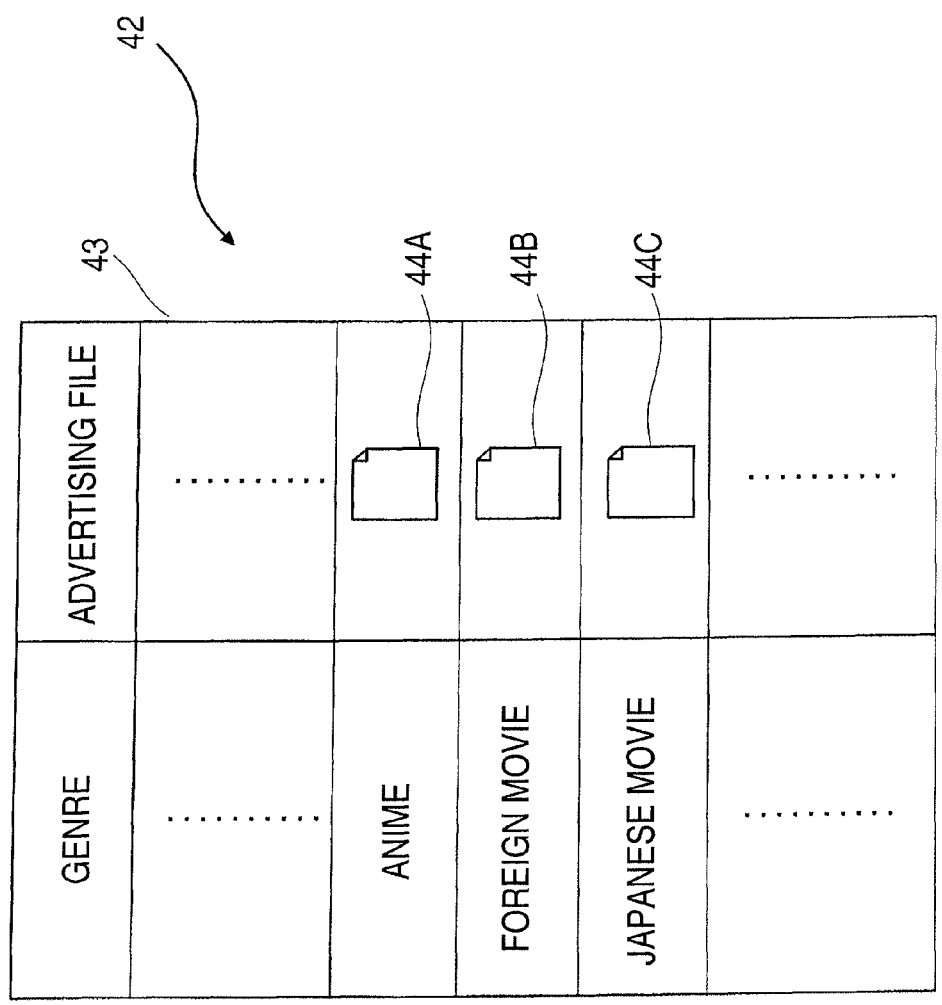
FIG. 4 is a diagram illustrating contents of an association table that is stored on a hard disk of the Web server illustrated in FIG. 3.

FIG. 4 is a diagram illustrating contents of an association table 43. The association table 43 is stored on the hard disk 42 of the Web server 4. The hard disk 42 stores the association table 43 in which a plurality of genres and advertising files (e.g., advertising data) 44A to 44C corresponding to the various genres are associated. For example, in the association table 43 shown in FIG. 4, advertising image data corresponding to the anime genre is held in the advertising file 44A, advertising image data corresponding to the foreign movie genre is held in the advertising file 44B, and advertising image data corresponding to the Japanese movie genre is held in the advertising file 44C. Furthermore, the advertising files 44A to 44C can further include audio data or text data for the advertisement.

FIG. 5 is a diagram illustrating contents of the conversion table 29A. The conversion table 29A is a table in which titles and genres have been pre-associated. The conversion table 29A shown in FIG. 5 is pre-stored in the memory component 29 of the BD player 2. A plurality of content titles and a plurality of genres are associated and described (or stored) in the conversion table 29A. The controller 21 of the BD player 2 accesses the Web server 4 to acquire the latest information of the contents of the conversion table 29A from the Web server 4 at a predetermined frequency, such as daily, or weekly. Then, the contents of the conversion table 29A are updated to the latest information. Accordingly, the number of titles in the conversion table 29A increases every time BD-ROM's for movies and the like go on sale.

Figure 6:
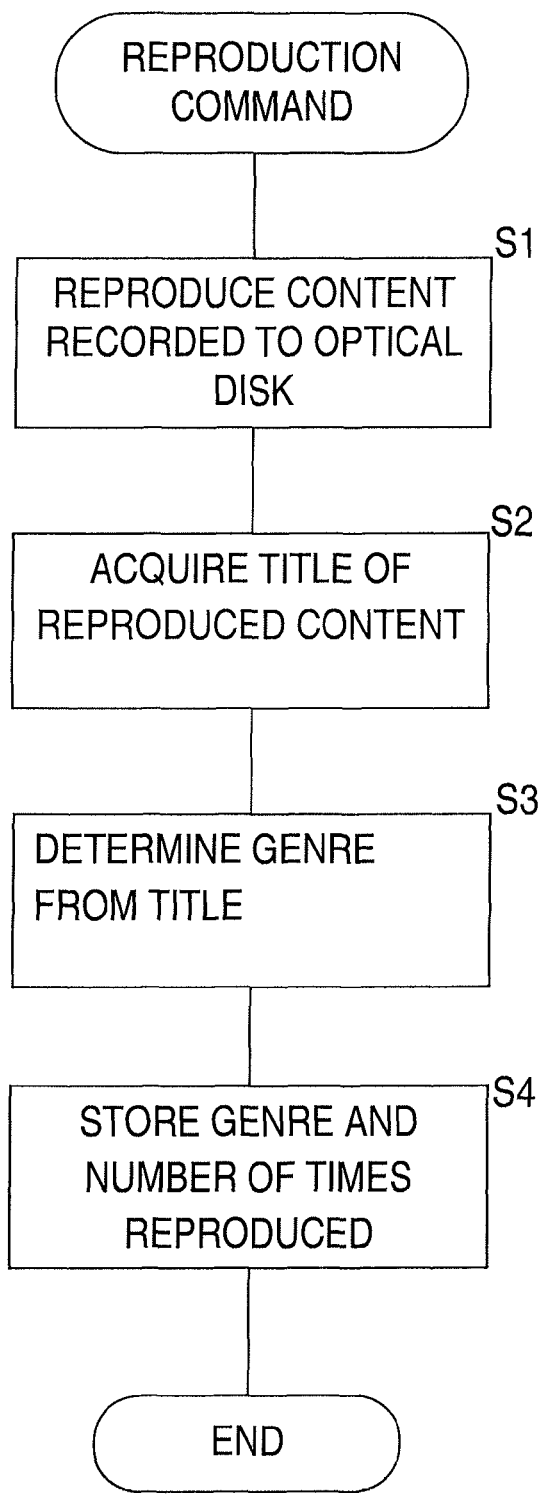
FIG. 6 is a flowchart illustrating an operation performed by the BD player during reproduction.

FIG. 6 is a flowchart illustrating an operation performed by the controller 21 of the BD player 2 during reproduction. The operation is performed when the user places the optical disk 100 in the device main body of the BD player 2 and uses the play key to begin reproduction of the content recorded to the optical disk 100. The operation is intended to ascertain the user's preferences and interests, and is executed every time the content is reproduced.

When the play key is pressed, the controller 21 reproduces the content recorded to the optical disk 100 (Step S1). Here, the controller 21 acquires the title of the content from the control information of the optical disk 100 via the pickup head 22 and the reproduction circuit 23 (Step S2). The control information is information stored in a lead-in region of the optical disk 100, VTSI (video title set information) for the optical disk 100, or a VMG (video manager) of the optical disk 100, for example.

The controller 21 then determines the genre of the reproduced content of the optical disk 100 from the acquired title base on the conversion table 29A (Step S3). The determination is performed by reading the genre corresponding to the acquired title from the conversion table 29A shown in FIG. 5.

The controller 21 increase the number of times the determined genre has been reproduced (e.g., reproduction counts) in the storage table 29B by one (Step S4), then the processing is ended. At this point the results of ascertaining the user's preferences and interests are stored in the storage table 29B.

FIG. 7 is a diagram illustrating contents of the storage table 29B in which the genres and the reproduction counts have been associated, respectively. The storage table 29B is a table that associates each of the genres that have been determined with the number of times the reproduction component 23 has reproduced contents that belongs to each of the genres. The number of reproductions corresponding to a genre increases every time content that belongs to the genre is reproduced. In this embodiment, only the number of times a genre is reproduced is associated with the genre and stored in the storage table 29B. However, the number of reproductions, subtitle language and audio language for use during reproduction can also be associated with genres and stored in the storage table 29B.

Figure 8:
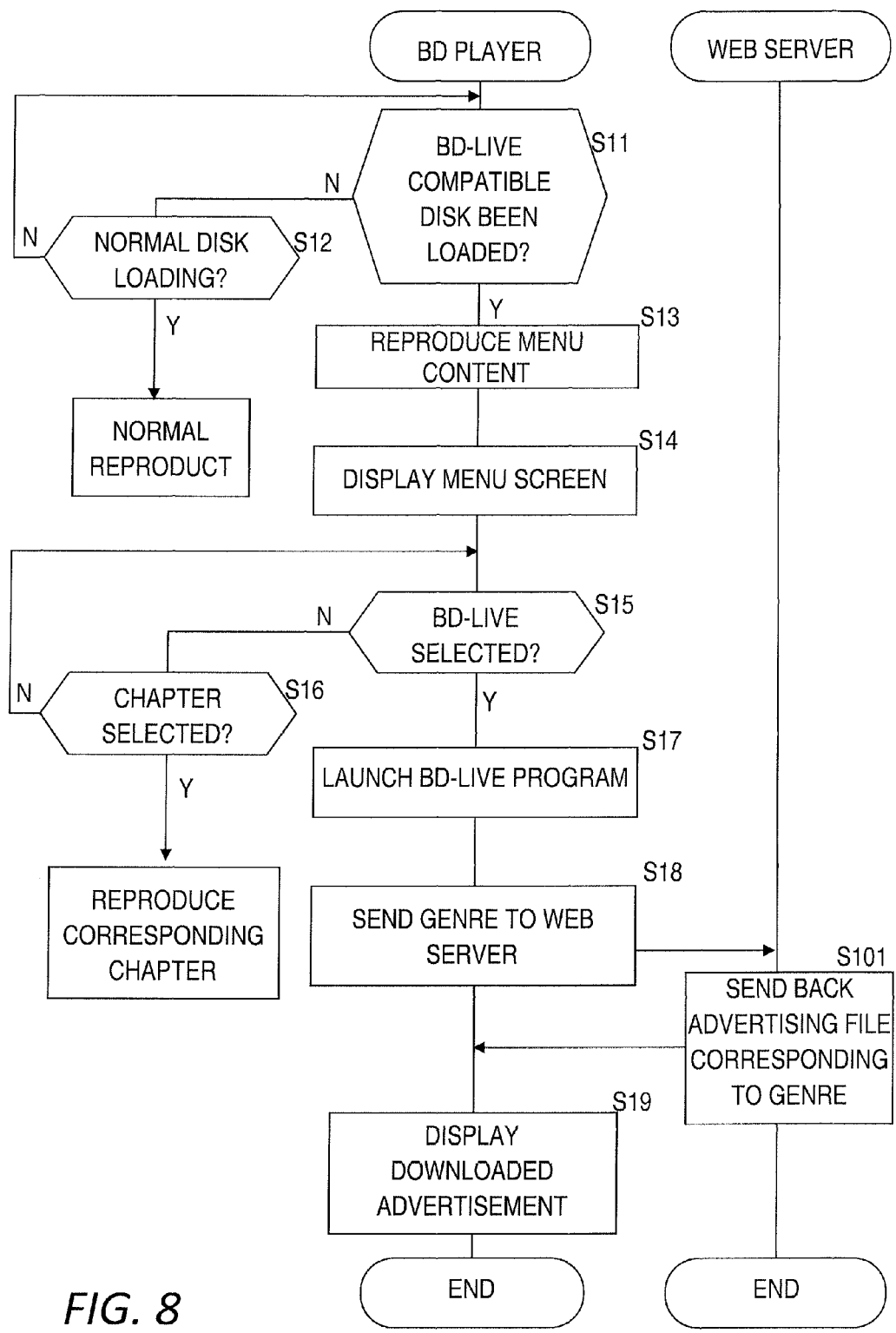
FIG. 8 is a flowchart illustrating an operation performed by the BD player and the Web server during optical disk placement.

FIG. 8 is a flowchart illustrating an operation performed by the controller 21 of the BD player 2 and the controller 41 of the Web server 4 during optical disk placement.

When the user places the optical disk 100 in the device main body of the BD player 2, the controller 21 of the BD player 2 determines whether the placed optical disk 100 is a BD-Live compatible BD-ROM or an optical disk other than a BD-Live compatible BD-ROM (Step S11, S12). Examples of optical disks other than a BD-Live compatible BD-ROM include a BD-Live incompatible BD-ROM, and a DVD-ROM.

If the controller 21 determines that the optical disk 100 is an optical disk other than a BD-Live compatible BD-ROM ("No" in Step S11, and then "Yes" in Step S12), then the controller 21 moves to the reproduction direction routine shown in FIG. 6. Specifically, upon detecting that the user has pressed the play key, the controller 21 executes normal reproduction.

On the other hand, if the controller 21 determines that the optical disk 100 is a BD-Live compatible BD-ROM ("Yes" in Step S11), then the controller 21 controls the pickup head 22 to read menu content from the optical disk 100 and reproduce the menu content prior to the reproduction of the main content of the optical disk 100 (Step S13). The menu content includes menu screens and warning messages notifying that copyright infringement is prohibited, for example.

The controller 21 then outputs a menu screen that prompt the user to select a chapter number of the chapter of the main content (e.g., chapter number category), or BD-Live (e.g., BD-Live category) to display the menu screen on the TV 3 (Step S14).

The controller 21 then determines whether the category of BD-Live has been selected, or the category of the chapter numbers has been selected (Step S15 and S16). In S15 and S16, the user looks at the menu screen while using the select key to select from among the chapter numbers and BD-Live.

If the chapter number category is selected ("No" in Step S15, and then "Yes" in Step S16), then the controller 21 reproduces the chapter of the selected chapter number, and proceeds to Step S2 in FIG. 6.

On the other hand, if the BD-Live category is selected ("Yes" in Step S15), then the controller 21 actuates a browser software of a BD-Live program (Step S17), which is expanded on the RAM 21A of the controller 21.

Out of all the genres stored in the storage table 29B, the controller 21 determines a genre that has been reproduced at least a specific number of times, and sends the genre from the NIC 20 to the Web server 4 (Step S18). In other words, the controller 21 selects one of the genres stored in the storage table 29B based on the reproduction counter stored in the storage table 29B. The specific number of times is preset to a number at which it can be concluded that there are user's preferences and interests. For example, the specific number of times is preset to two, five, or ten times. Alternatively, the specific number of times is preset to the highest number of times out of all the genres stored in the storage table 29B. Thus, when the specific number of times is preset to the highest number of times out of all the genres stored in the storage table 29B shown in FIG. 5, then the genre of anime is sent to the Web server 4.

Upon receipt of the genre sent from the BD player 2, the controller 41 of the Web server 4 reads an advertising file corresponding to that genre from the association table 43, and sends back the advertising file (Step S101). When the controller 41 of the Web server receives the genre of anime, then the advertising file 44A of the association table 43 is sent back to the BD player 2.

Figure 9:
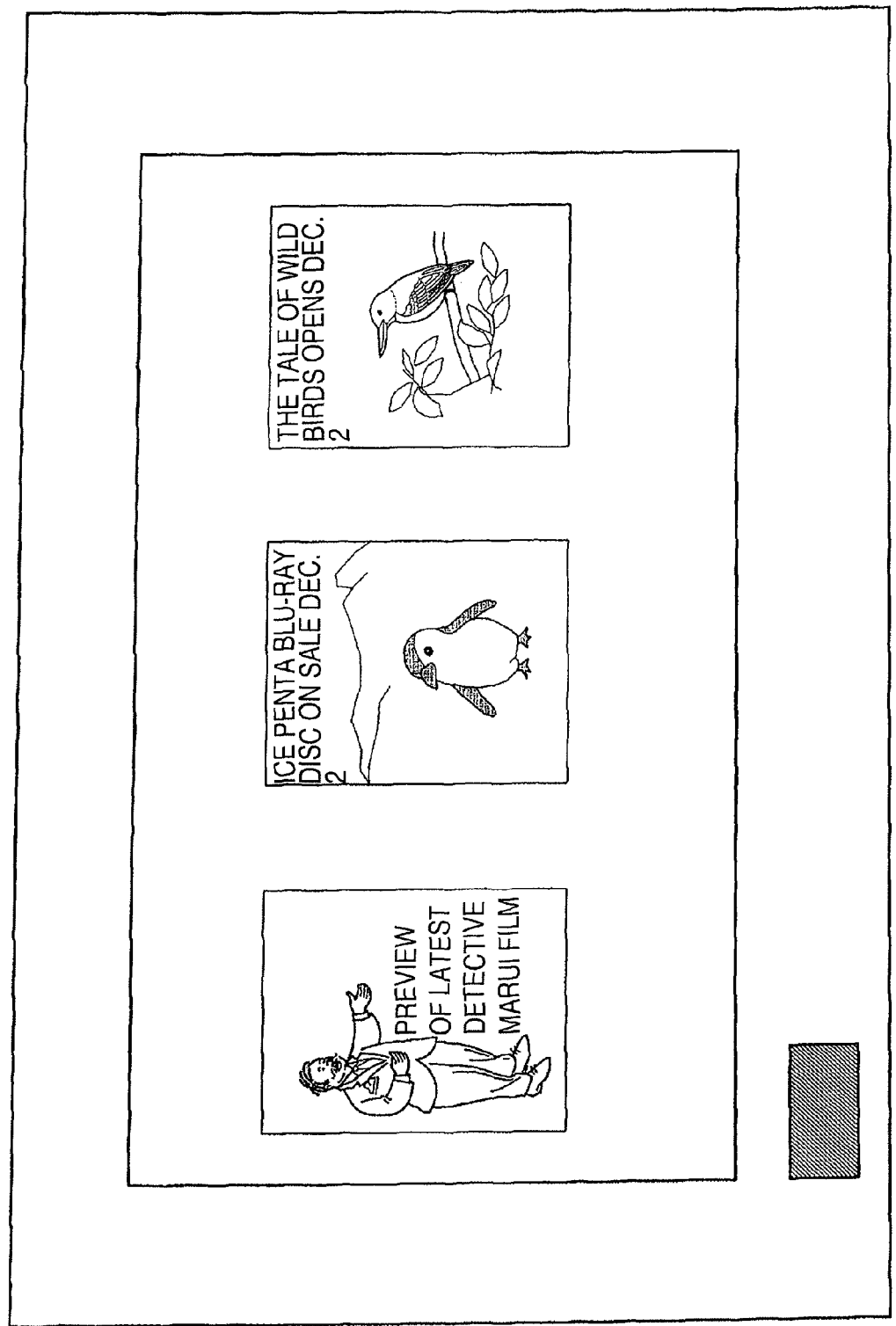
FIG. 9 is a diagram illustrating an example of advertisement displayed by the advertising system.

Upon downloading the advertising file 44A from the NIC 20, the controller 21 of the BD player 2 transfers image data for the advertisement stored in the advertising file 44a to the buffer memory 23A of the reproduction circuit 23, and instructs the reproduction circuit 23 and the video output component 25 to output an advertising image (moving or still picture) based on the image data to the TV 3 (Step S19). As a result, the advertising is displayed on the TV 3 as shown in FIG. 9. In Step S19, if the advertising file 44a stores video data and audio data for the advertisement, then the controller 21 of the BD player 2 transfers the video data and the audio data to the buffer memory 23A of the reproduction circuit 23, and instructs the reproduction circuit 23, the audio output component 24 and the video output component 25 to output an advertising movie based on the video data and the audio data to the TV 3.

FIG. 9 is a diagram illustrating an example of advertisement displayed by BD-Live. Because the user's preferences and interests have been ascertained from the content that has been reproduced, the advertisement matches the user's preferences and interests. Therefore, when the advertisement is displayed on the TV 3, the user takes an interest and looks at the advertisement.

Thus, with the advertising system 101, advertisement by BD-Live is more effective at conveying the advertising message. Also, since the displayed advertisement is of greater interest to the user, the utilization of BD-Live can be enhanced.

With the advertising system 101, the BD player 2 includes reproduction means (e.g., the pickup head 22, the reproduction circuit 23, the audio output component 24, and the video output component 25), determination means (e.g., the controller 21), memory means (e.g., the memory component 29), communication means (e.g., the controller 21 and the NIC 20), and output means (e.g., the reproduction circuit 23 and the video output component 25). The reproduction means reads and reproduces recorded content from the optical disk 100 placed in the device main body of the BD player 2. The determination means determines the genre of the content every time content is reproduced by the reproduction means. The memory means stores the storage table 29B for associating and storing the genre determined by the determination means and the number of times the content that belongs to the genre is reproduced. The communication means downloads, from the Web server 4 and via the network 5, one of the advertising files 44A, 44B and 44C belonging to a genre that has been reproduced at least a specific number of times out of all the genres stored in the storage table 29B, when the optical disk that prerecords browser software has been placed in the device main body of the BD player 2 and the launch of the browser software has been directed in this state. The output means outputs the advertising image data of the one of the advertising files 44A, 44B and 44C downloaded by the communication means. The output means is connected to a display device (e.g., the TV 3) that displays an advertisement based on the outputted advertising image data.

With the BD player 2, the optical disk 100 includes a BD-ROM that has prerecorded browser software, a BD-ROM that has not prerecorded the browser software, or a DVD-ROM. The display device includes the TV 3 or a monitor.

The process on the BD player 2 includes a first stage in which the user's preferences and interests are surveyed, and a second stage in which advertisement is downloaded from the Web server 4. First, in the first stage, every time the content recorded on the optical disk 100 is reproduced, the genre of that content is determined by the determination means. The genre and the number of times that genre has been reproduced are then stored in the storage table 29B. Next, the second stage will be described. When the optical disk 100 that has prerecords browser software is placed in the device main body of the BD player 2 and a command is issued to launch the browser software, then advertising image data belonging to a genre that has been reproduced at least a specific number of times out of all the genres stored in the storage table 29B is downloaded from the Web server 4 by the communication means. The specific number of times is, for example, two, five, or ten times, and is preset to a number of times at which it can be concluded that there are user's preferences and interests. When the communication means downloads the advertising image data, the output means displays an advertising image based on the advertising image data on the TV 3. Here, since the user's preferences and interests have been determined from the content that is reproduced, the advertisement corresponds to the user's preferences and interests. Accordingly, when the advertisement is displayed on the TV 3, the user takes an interest and looks at the advertisement. Thus, the advertisement provided by the optical disk 100 that prerecords browser software is more effective at conveying the advertising message. Also, since the displayed advertisement is of greater interest to the user, the utilization of the browser software can be enhanced.

With the BD player 2, the memory means further stores the conversion table 29A for associating and storing a plurality of content titles and a plurality of genres. The determination means acquires a content title from the optical disk 100 every time the content is reproduced by the reproduction means, reads the genre corresponding to the acquired title from the conversion table 29A, and determines the genre.

With the BD player 2, the genre of the content is determined based on the conversion table 29A.

With the BD player 2, the optical disk 100 that prerecords browser software is a Blu-Ray disc that is compatible with BD-Live.

The advertising system 101 includes the BD player 2 and the Web server 4. The Web server 4 is connected to the BD player 2 via the network 5. The Web server 4 includes memory means (e.g., hard disk 42), and reply means (e.g., controller 41). The memory means associates and stores genres and advertising image data. The reply means receives a genre sent from the BD player 2, and thereupon reads the advertising image data belonging to the genre from the memory means, and replies to the communication means with the advertising image data thus read.

The advertising system 101 makes use of the BD player 2. Thus, the same effect is obtained with the advertising system 101 as with the BD player 2.

Furthermore, with the advertising system 101, advertisement can be displayed that corresponds to a user's preferences and interests. Therefore, the advertisement provided by the optical disk 100 that prerecords browser software is more effective at conveying the advertising message.

With the BD player 2, the number of reproductions, the subtitle language and the audio language for use during reproduction can also be associated with the genres and stored in the storage table 29B. When the storage table 29B stores the subtitle language and the audio language, the BD player 2 can acquire the advertisement corresponding to the language. In particular, when the storage table 29B stores the subtitle language and the audio language, the controller 21 of the BD player 2 sends the genre with language information indicating a language that is used for the subtitle language or the audio language during reproduction of the contents of the genre (Step S18 in FIG. 8). When the Web server 4 receives the genre with the language information, the controller 41 of the Web server 4 reads an advertising file corresponding to the genre and the language information (Step S101 in FIG. 8). Specifically, the controller 41 of the Web server 4 determines an advertising file in the language indicated by the language information, or advertising file that indicates the latest movie previews of the genre in the language, the dates when movies of the genre in the language open at theaters, or the dates Blu-ray discs in the language go on sale.

With the BD player 2, the advertisement corresponding to the genre and the language can be obtained.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only a preferred embodiment has been chosen to illustrate the present invention, it will be apparent to those skilled in the art from this disclosure that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Thus, the foregoing descriptions of the embodiment according to the present invention are provided for illustration only, and not for the purpose of limiting the invention as defined by the appended claims and their equivalents.

What is claimed is:

1. An optical disk device comprising:
   a reproduction component configured to reproduce contents stored in optical disks that are loaded in the optical disk device;
   a determination component configured to determine genres of the contents while the reproduction component reproduces the contents;
   a memory component configured to store a first table that associates each of the genres that have been determined by the determination component with a reproduction counter that indicates a number of times the reproduction component reproduced the contents that belong to each of the genres;
   a communication component configured to communicate with a server via a network the communication component being further configured to download from the server advertising data corresponding to one of the genres stored in the first table, the one of the genres being selected based on the reproduction counter of the first table; and
   an output component configured to output an advertisement based on the advertising data that is downloaded by the communication component,
   the memory component being further configured to store a second table that associates each of content titles of the contents with a genre of each of the contents,
   the determination component being further configured to acquire a content title of a content from the optical disk when the reproduction component reproduces the content, the determination component being further configured to determine the genre of the content corresponding to the content title that is acquired from the optical disk based on the second table.

2. The optical disk device according to claim 1, further comprising
   a selection component configured to select the one of the genres with a reproduction counter that is greater than a predetermined number of times from the genres stored in the first table,
   the communication component being further configured to send the one of the genres that has been selected by the selection component to the server, and download the advertising data corresponding to the one of the genres that has been selected by the selection component.

3. The optical disk device according to claim 1, further comprising
   a selection component configured to select the one of the genres with a reproduction counter that is the highest of the reproduction counters stored in the first table,
   the communication component being further configured to send the one of the genres that has been selected by the selection component to the server, and download the advertising data corresponding to the one of the genres that has been selected by the selection component.

4. The optical disk device according to claim 1, wherein the output component is configured to output the advertisement to a display device that is electrically connected to the optical disk device to display the advertisement on the display device.

5. The optical disk device according to claim 1, wherein the communication component is further configured to communicate with the server to download the advertising data when the optical disk is loaded in the optical disk device and a browser software stored in the optical disk is activated.

6. The optical disk device according to claim 5, wherein the communication component is configured to communicates with the server to download the advertising data when a BD-Live compatible Blu-Ray disc, which corresponding to the optical disk, is loaded in the optical disk device and the browser software stored in the Blu-Ray disc is activated.

7. The optical disk device according to claim 1, wherein the communication component is configured to communicate with the server to download the advertising data when a BD-Live compatible Blu-Ray disc, which corresponding to the optical disk, is loaded in the optical disk device and the browser software stored in the Blu-Ray disc is activated.

8. An advertising system comprising:

a server electrically connected to a network, the server including a memory configured to store advertising data and genres that are mutually associated with each other, and a reply component configured to receive a genre via the network, and send the advertising data corresponding to the genre that is stored in the memory; and an optical disk device electrically connected to the server via the network, the optical disk device including a reproduction component configured to contents stored in optical disks that are loaded in the optical disk device;

a determination component configured to determine genres of the contents while the reproduction component reproduces the contents;

a memory component configured to store a first table that associates each of the genres that have been determined by the determination component with a reproduction counter that indicates a number of times the reproduction component has reproduced the contents that belong to each of the genres;

a communication component configured to communicates with the server via the network, the communication component being further configured to download from the server the advertising data corresponding to one of the genres stored in the first table, the one of the genres being selected based on the reproduction counter of the first table; and an output component configured to output advertisement based on the advertising data that is downloaded by the communication component, the memory component of the optical disk device being further configured to store a second table that associates each of content titles of the contents with a genre of each of the contents, the determination component of the optical disk device being further configured to acquires a content title of a content from the optical disk when the reproduction component of the optical disk device reproduces the content, the determination component of the optical disk device being further configured to determine the genre of the content corresponding to the content title that is acquired from the optical disk based on the second table.

9. The advertising system according to claim 8, wherein the reply component of the server is further configured to receive the one of the genres that is sent from the communication component of the optical disk device, read the advertising data corresponding to the one of the genres from the memory of the server, and reply to the communication component of the optical disk device with the advertising data that is read from the memory of the server.

10. The advertising system according to claim 8, wherein the communication component of the optical disk device is configured to communicate with the server to download the advertising data when a BD-Live compatible Blu-Ray disc, which corresponding to the optical disk, is loaded in the optical disk device and the browser software stored in the Blu-Ray disc is activated.

11. An advertising method comprising:

reproducing contents stored in optical disks that are loaded in an optical disk device;

determining genres of the contents during reproducing the contents;

storing a first table that associates each of the genres that have been determined with a reproduction counter that indicates a number of times the contents that belongs to each of the genres have been reproduced;

storing a second table that associates each of content titles of the contents with a genre of each of the contents;

downloading advertising data corresponding to one of the genres stored in the first table from a server that is connected to the optical disk device via a network, the one of the genres being selected based on the reproduction counter of the first table; and outputting an advertisement based on the advertising data that is downloaded, the determining of the genres of the contents including acquiring a content title of a content from the optical disk upon reproducing the content, and determinin the genre of the content corresponding to the content title that is acquired from the optical disk based on the second table.

* * * * *